United States Patent [19]

Okamoto

[11] Patent Number: 5,514,940
[45] Date of Patent: May 7, 1996

[54] CONTROL DEVICE FOR AN ELECTRICALLY POWERED FOLDABLE REARVIEW MIRROR FOR AUTOMOBILES

[75] Inventor: Toru Okamoto, Fujieda, Japan

[73] Assignee: Murakami Kaimeido Co. Ltd., Shizuoka, Japan

[21] Appl. No.: 450,503

[22] Filed: May 26, 1995

[30] Foreign Application Priority Data

Aug. 3, 1994 [JP] Japan .................................. 6-200252

[51] Int. Cl.$^6$ ............................. G02B 7/182; H02P 1/04
[52] U.S. Cl. ......................... 318/469; 318/466; 359/841; 359/877
[58] Field of Search ..................................... 318/286, 287, 318/466, 469, 484, 445; 361/24, 27, 31, 166, 194; 359/877, 841

[56] References Cited

U.S. PATENT DOCUMENTS

| | | | |
|---|---|---|---|
| 4,833,876 | 5/1989 | Shimura | 318/286 |
| 4,973,146 | 11/1990 | Nakayama | 318/445 |
| 4,981,347 | 1/1991 | Nakayama | 359/841 |
| 5,315,422 | 5/1994 | Sato et al. | 359/877 |

*Primary Examiner*—John W. Cabeca
*Attorney, Agent, or Firm*—Michael J. Striker

[57] ABSTRACT

The control device controls an electrically powered foldable rearview mirror in which a mirror body is reversibly rotatable around a shaft by an electric motor contained in the mirror body and in which the mirror body rotation is stopped in a predetermined erected position and folded position by rotation stop devices. The control device for controlling mirror rotation includes a switching circuit for switching the power supply connections to the motor to rotate the mirror body in one of two direction, a relay circuit for supplying and cutting off power to the motor and a relay control circuit connected to the relay circuit and the motor. The relay control circuit includes a resistance and a semiconductor device for switching the relay control circuit connected in parallel with the resistance to perform a switching operation when the motor driving electric current is increased due to a stoppage of the mirror body rotation which causes the voltage drop across the resistance to exceed a threshold voltage of the semiconductor device and to open or release the relay cutting off current to the motor.

13 Claims, 6 Drawing Sheets

CONTROL DEVICE FOR AN ELECTRICALLY POWERED FOLDABLE REARVIEW MIRROR FOR AUTOMOBILES

BACKGROUND OF THE INVENTION

1. Field of the Invention

The present invention relates to an electrically powered foldable rearview mirror for automobiles and, more particularly, to a control device for an electrically powered foldable rearview mirror for automobiles which is provided with a simple and compact circuit resulting in a safer operation.

2. Description of the Relevant Art

The known electrically powered foldable rearview mirror for automobiles projects from a vehicle body side and is folded when the automobile is parked. For example, as disclosed by Japanese Utility Model Registration Application Publication Sho 63-169341, the electrically foldable rearview mirror comprises a mirror body, a motor attached to a frame for folding the mirror body electrically, a shaft erected on a base where the mirror body is attached, a gear engageably and removably mounted on the shaft and a speed reduction mechanism provided between the motor and the gear. The gear is arranged around the shaft and has a clutch mechanism so that, when the mirror body is folded electrically, the gear is fixed on the shaft, but when the mirror body is forced to rotate, the gear is free of the shaft. An end gear of the speed reduction mechanism engages with a clutch gear. Both the speed reduction mechanism containing the end gear and the frame for supporting that mechanism are centered around the shaft and normally and reversely rotated around the shaft by an actuation of the motor, so that the mirror body reaches a normal (erected) state or a folded state.

The rotation mechanism for the mirror body includes a mirror body positioning means (location means) comprising a stopper plate and steel balls and is provided between a shaft root portion which is erected on an extension of a base and a frame root portion.

Steel balls are supported on a concave spherical seat formed on an undersurface of the frame root portion so as to rotate with the frame when the mirror body is rotated. When the mirror body reaches the erected state, the steel balls contact with a stopper shoulder of a stopper plate.

Rotation stop means for the mirror body comprises a convex portion and an arc-shaped groove provided under the frame root portion to receive the convex portion. When the frame rotates around the shaft, the arc-shaped groove of the frame root portion is guided over the convex portion. When the mirror body is held in the folded state, the convex portion which is part of the rotation stop means for the mirror body in a folded state contacts with one end of the arc-shaped groove to stop the mirror body rotation.

In a conventional method of switching off a motor driving circuit to stop the mirror body rotation in the erected state or the folded state when the electrically foldable rearview mirror is erected or folded, for example, a mechanism is provided including a limit switch, a plate contact switch or the like. As disclosed by Japanese Utility Model Registration Application Publication No. Hei 4-76196, there is another method which is based on a characteristic of a PTC component (element), and in which the motor driving circuit is cut off by increased electric current when the motor rotation is locked. Furthermore it is known to control the motor by a sensor including for example a photoreflector or a magnetic induction component (element) to detect the motor rotation.

However in a conventional method of switching off the motor driving circuit as described above such as that using above-mentioned mechanical mechanism, it is difficult to adjust the circuit switching position at the mirror body erected state or the folded state and a wrong operation such as an imperfect contact is easily caused by foreign contamination in the rotating contact portion. Moreover in the method using the PTC component, during a comparatively large time lag from the occurrence of the overload on the motor to a predetermined temperature of PTC component, the electric power is still being supplied to the motor. Consequently there is a danger that the positioning accuracy for the mirror body is so decreased that the mirror body moves out of the controlled state and the motor is damaged by overheating. The durability of parts is decreased because the driving circuit is loaded or because of heat generated by continuous excess current in the circuit and the circuit parts are damaged or ignite.

Moreover in the method based on detecting the motor rotation, there is danger that the sticking dust, contaminants or the like on the sensor portion cause faulty operation of the device. Furthermore due to a complicated electronic circuit composed of an amplifier circuit, a driving circuit or the like which is necessary for converting a sensor signal to the motor control signal, the system becomes comparatively expensive.

SUMMARY OF THE INVENTION

It is an object of the present invention to provide a control device for an electrically powered foldable rearview mirror capable of operating a compact down-sized rearview mirror, having an improved simple and compact circuit, and moreover capable of providing a safe mirror body rotation.

According to a preferred embodiment of the present invention, an electrically powered foldable rearview mirror for automobiles includes a mirror body reversibly rotatable around a shaft of a base by an electric motor contained in the mirror body and the mirror body rotation is stopped by rotation stop means at a predetermined erected position and folded position. The electrically powered foldable rearview mirror includes a control device comprising a switching circuit including means for connecting the electric motor to a power supply to rotate the mirror body into the erected position or the folded position, a relay circuit connected electrically to the switching circuit and to the electric motor and including means for supplying and for cutting off an electric current supplied to the electric motor, and a relay control circuit comprising a shunt-type resistance connected in parallel with the motor and a semiconductor device connected in parallel with the resistance so as to convert the electric current for the motor to a voltage so that when the mirror body rotation is stopped by contacting with the rotation stop means or by application of an external force, the relay control circuit is put ON to release or open the relay circuit when the voltage drop across the resistance is greater than a predetermined threshold voltage of the semiconductor device.

The semiconductor device preferably includes a diode or a transistor which performs a switching operation when a voltage such as a forward voltage and Zener-voltage of its pn junction is over a threshold voltage. The semiconductor device advantageously includes a light emitting diode for the semiconductor device which is put ON to emit the light when the voltage drop occurring across the shunt-type resistance is over the predetermined threshold voltage of the semiconductor device. The semiconductor device in a preferred embodiment includes a photocoupler including the light emitting diode and a light detecting component such as a phototransistor or cadmium sulfide CdS.

The improved relay control circuit according to the invention is provided in a compact package by using the photocoupler or in a package including the relay circuit and the relay control circuit located in the mirror body. Advantageously in the above-described embodiment of the present invention, when the rotation of the mirror body halted at the folded state or the erected state or by action of an external force or by meeting an obstacle during rotation, an electric driving current is increased by an overloaded motor and a voltage drop across the shunt-like resistance connected between the switching circuit and the motor is also increased. When the voltage drop across the resistance is over the predetermined threshold comprising a forward voltage or Zener-voltage of a pn junction of a diode or transistor connected in parallel with this resistance, the semiconductor device is operated to switch an electric current. As a result, a relay control circuit which cooperates with the semiconductor device is actuated to release or open the relay in the relay circuit, and the motor electric driving current is cut off. In the preferred embodiment described hereinafter, under a temperature range from −30° to 80° C. and over a wide range of power source voltage from 9 V to 16 V, the time interval from the forced stopping of the mirror body to the cut off of the motor electric driving current is set within 100 millisecond.

Furthermore, since the motor is overloaded to eliminate the time lag so as to almost instantly cut off the power source supply to the driving circuit, the mirror body is prevented from moving beyond the predetermined stopping position, whereby the positioning accuracy is improved to prevent the motor from being damaged by burning. As a result, the driving system is prevented from overloading to improve the durability of the parts of the device. Furthermore in case the mirror body is forced to stop due to an encounter with an external obstacle during the rotation, the driving current for the motor is instantly cut off to improve the safety of operation. For example in case of the obstacle being a human arm, due to the time lag from impact with the human arm to the cutting off of the motor current, there is a danger that the arm is injured by the continuing rotation force during that time interval. In the system of the present invention, the driving circuit is instantly cut off when the mirror rotation is stopped by the human arm so as to prevent a serious injury to the person. Moreover the semiconductor device is driven by an increased voltage drop across the shunt resistance, whereby it is possible for the control device to avoid the effects of dust or contaminants.

The above and further objects, details and advantages of the present invention will become apparent from the following detailed description of preferred embodiments thereof, when read in conjunction with the accompanying drawings.

DESCRIPTION OF THE PREFERRED EMBODIMENTS

Figure 1:
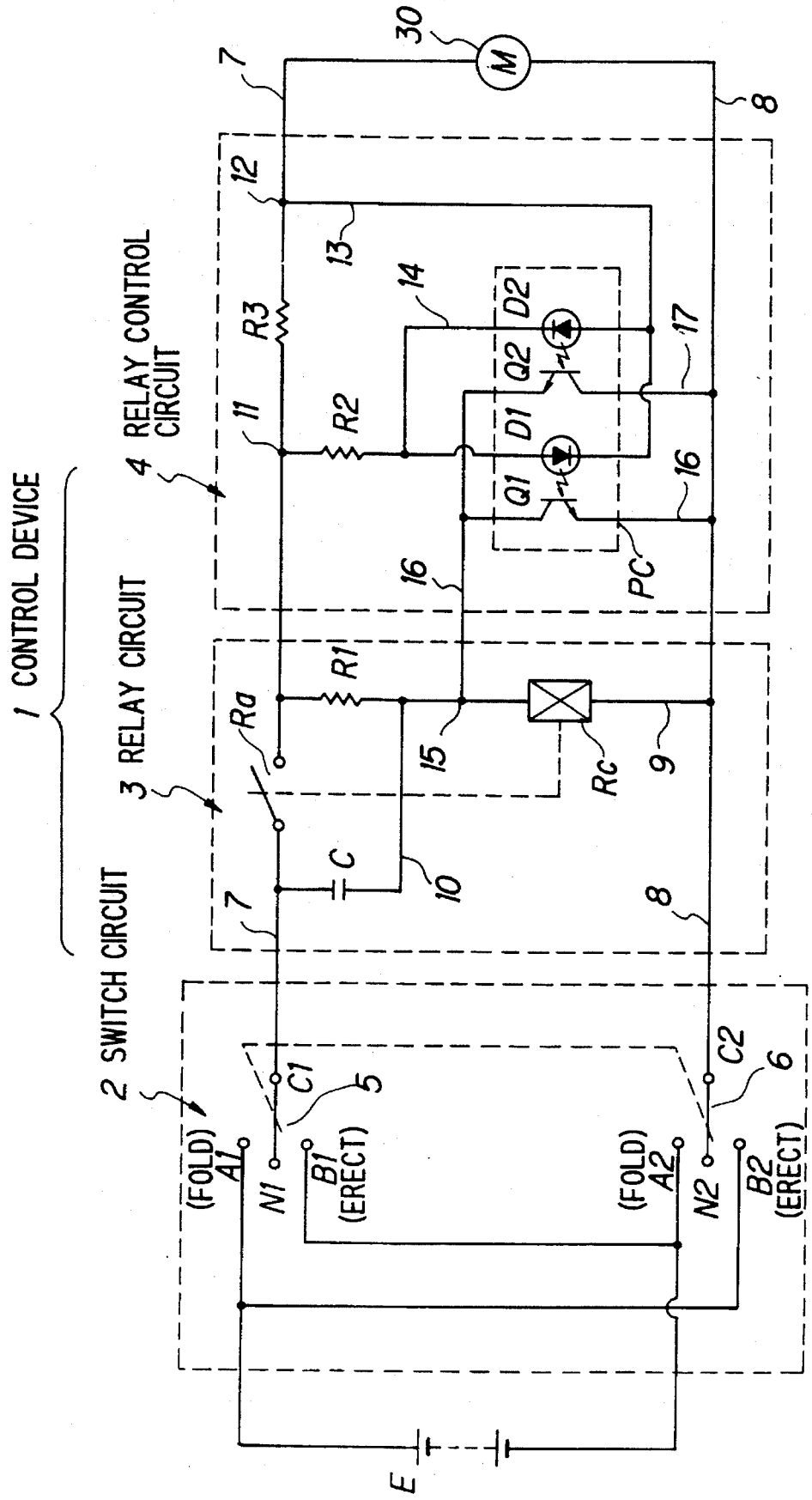
FIG. 1 is a schematic diagram of a control circuit of an electrically powered foldable rearview mirror according to a preferred embodiment of the present invention.

As shown in FIG. 1, a control device 1 for an electrically powered foldable rearview mirror according to the present invention comprises a power source E, a switching circuit 2, a relay circuit 3, a relay control circuit 4 and a motor 30. The power source E is a battery normally present in an automobile and the switching circuit 2 is mounted in an interior instrument panel or the like around the driver's seat for operation by the driver. The switching circuit 2 is composed of switches comprising two contacts and two circuits so that the positive terminal of the power source E is connected to contacts A1, B2 respectively and the negative terminal is connected to contacts A2, B1 respectively. The switch includes movable contact elements 5, 6 which are connected and cooperate with each other to reverse the positive and negative voltages at contacts C1, C2.

The relay circuit 3 is provided between the switching circuit 2 and the motor 30 to flow or cut off a motor electric driving current. The circuit 3 is composed of a resistance R1 and a relay coil Rc which are connected in series with each other in a branch line 9 connected between lines 7 and 8. Lines 7 and 8 are connected to respective terminals of movable contact elements 5, 6 of the switch. A capacitor C is connected in parallel with the resistance R1 and is provided in a branch line 10 connecting lines 7 and 9. A relay contact Ra is provided in the line 7 between the connection points for lines 10 and 9. When the switch is put in the mirror erecting configuration or the mirror folding configuration, the relay coil Rc is excited by a charging electric current of the capacitor C to close the relay contact Ra, whereby the contact C1 in the switching circuit 2 is connected to the contact C2 in the switching circuit 2 through the relay contact Ra in the line 7, the resistance R1 in the line 9, the relay coil Rc and the line 8 and the relay contact Ra is kept closed, the relay thus being self-holding.

For converting the electric current supplied to the motor 30 to the motor operating voltage, the relay control circuit 4 is composed of a shunt-type resistance R3 connected in series to the motor and a semiconductor (a photocoupler PC is shown in the present invention) connected in parallel with the resistance R3.

When a mirror body 25 contacts with rotation stop means 70 or the mirror body is forced to halt the rotation due to an externally applied force, the relay control circuit 4 is prepared to activate the relay circuit 3 in such a manner that the voltage drop across the resistance R3 is greater than the threshold voltage for putting the semiconductor to ON, i.e. turning it on. The resistance R3 is provided between the relay contact Ra in the line 7 from the terminal of movable contact element 5 and the motor 30. A loop line 13 is connected to the points 11 and 12 in the line 7 between which the resistance R3 is connected. The loop line 13 includes the resistance R2 connected in parallel with the resistance R1. Diode D1 is connected in series to the resistance R2 in loop line 13. A branch line 14 is connected at both of its ends to the line 13 to connect diode D2 in parallel with diode D1, and diodes D1, D2 of the photocoupler PC and the resistance R2 are connected in parallel with the resistance R3. Diodes D1, D2 are reversely connected in parallel with each other to detect the voltage drop across the resistance R3.

A transistor Q1 is connected by connecting a line 16 to both a point 15 between the resistance R1 and the relay coil Rc in the branch line 9 and the line 8 connected to the terminal of the movable contact element 6, and a transistor Q2 is connected in a branch line 17 in parallel with the transistor Q1 in the line 16. As described hereinbefore, transistors Q1, Q2 are positioned opposite to respective diodes D1, D2 of the photocoupler PC and both are connected in parallel with the relay coil Rc. The electric current direction of the circuit is adjusted with one of diodes D1, D2.

Figure 2:
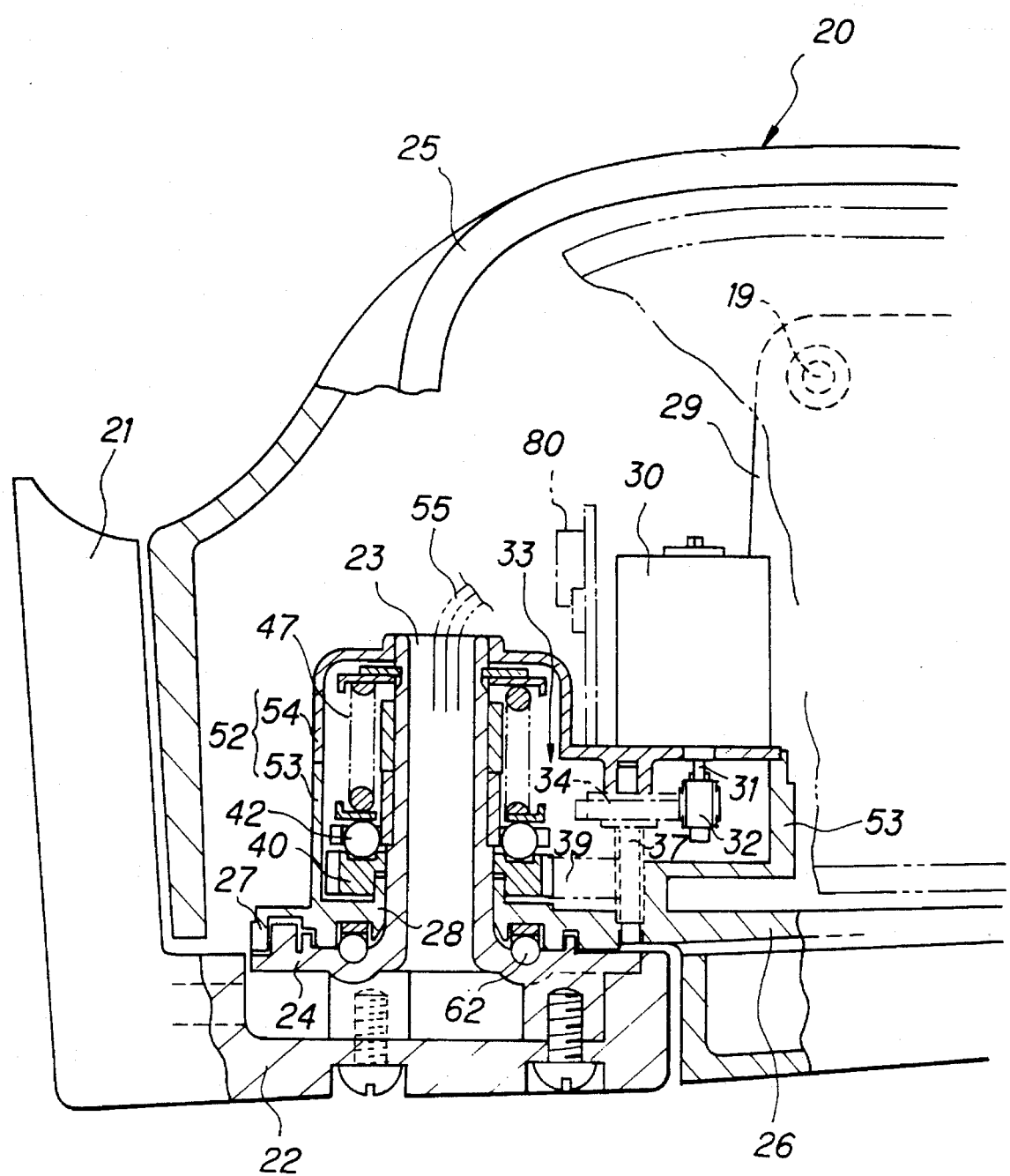
FIG. 2 is a partial cut-away front view of the rearview mirror according to the present invention.

The circuit of the control device of the present invention can be assembled into a compact unit including the photocoupler, and a package of the relay control circuit or a package 80 including the relay circuit and the relay control circuit can be assembled in the mirror body 25 as shown by FIG. 2.

Operation of the control device of the present invention is described hereinbelow.

Figure 3:
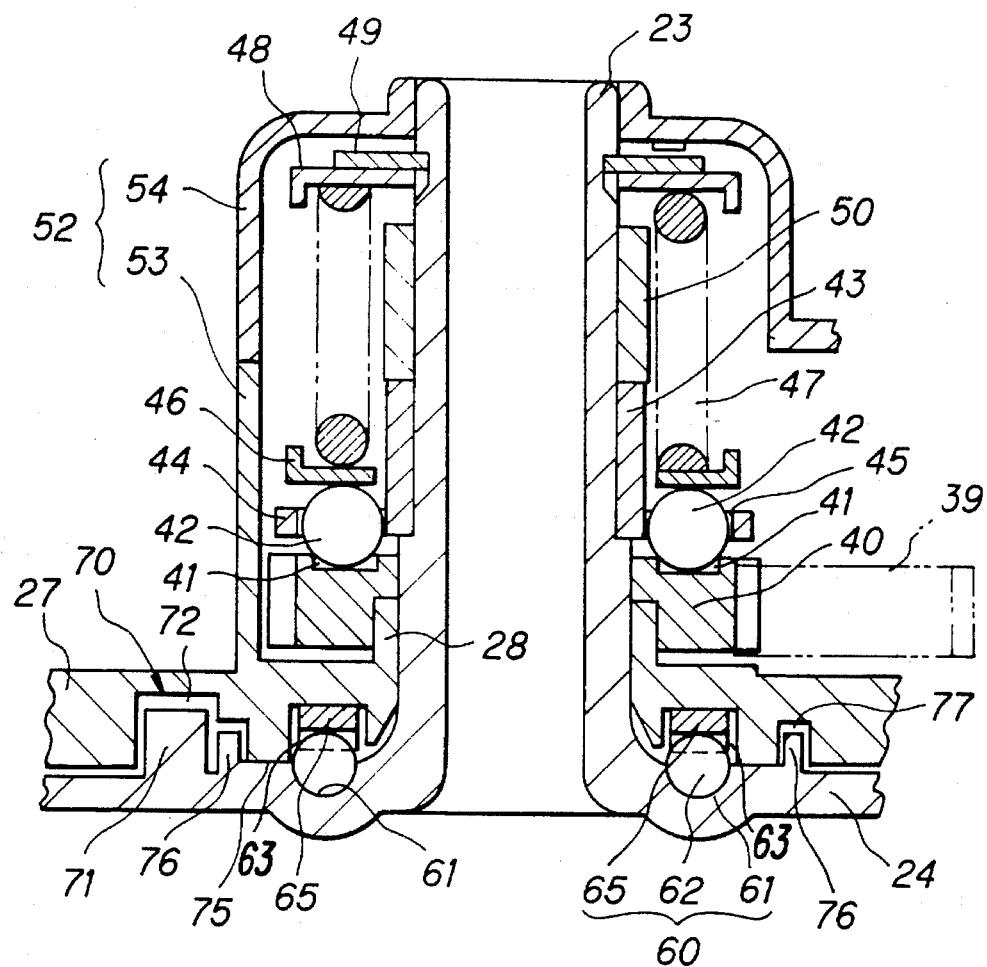
FIG. 3 is a detailed vertical cross-sectional view of a shaft of the rearview mirror shown in FIG. 2.

(1) The rearview mirror rotates from the erected state to the folded state:

The switching circuit 2 is operated to perform the folding actuation. The movable contact elements 5, 6 are contacted to the contacts A1, A2 and the charging electric current is instantly applied to the capacitor C by the contact C1 contacting with the contact A1. The relay coil Rc is excited by the charging electric current and the relay contact Ra is closed to put the circuit ON. The electric current is applied to the contact C1→the relay contact Ra→the resistance R1→ the relay coil Rc→the contact C2 to keep the relay contact Ra closed. Furthermore the current is applied to the contact C1→the relay contact Ra→the resistance R3→the motor 30→the contact C2 to start the motor 30 to rotate, and the rearview mirror starts to rotate in the folding direction. Rotation stop means 70 as shown by FIG. 3 which is described hereinafter, mechanically stops the rotation of the rearview mirror at its folded state and the rotation of the motor 30 is also stopped.

The electric driving current of the motor 30 is increased by stopping the rotation as described above. Then the voltage drop across both ends of the resistance R3 in the relay control circuit 4 is also increased. When the voltage drop is just greater than the forward voltage of the light emitting diode D1 in the photocoupler PC, the electric current is applied to diode D1 generating light. The transistor Q1 located opposite to the light emitting diode D1 is actuated by the emitted light to put the circuit ON. Then the energized electric current applied to the relay coil Rc is applied through the transistor Q1, and the electric current can no longer hold the relay contact Ra closed and releases it. The circuit 3 is opened and the electric driving current for the motor 30 is also cut off.

In case the rotation of the rearview mirror is stopped due to an encounter with an obstacle or the like on the way from the erected state to the folded state, the circuit 3 of the control device is opened by actuation as described above, and the electric driving current for the motor 30 is also cut off.

(2) The rearview mirror rotates from the folded state to the erected state:

The erecting actuation is performed by operating the switching circuit 2. The movable contact elements 5, 6 are contacted with contacts B1 and B2 respectively, and the charging current is instantly applied to the capacitor C via the relay coil Rc from the contact C2 which contacts the contact B2. The relay coil Rc is excited by the charging current and the relay contact Ra is closed to put the circuit ON. The electric current is then applied to the contact C2→the relay coil Rc→ the resistance R1→the relay contact Ra→the contact C1 and the relay contact Ra is thus kept closed. Furthermore the electric current is applied to the contact C2→the motor 30→the resistance R3→the relay contact Ra→the contact C2, then the motor 30 starts to rotate and the rearview mirror also starts to rotate to the erected state.

The rearview mirror mechanically stops the rotation by rotation stop means 70 (as shown by FIG. 3) at the erected state and the rotation of the motor 30 is also stopped, whereby the electric driving current for the motor 30 is increased, then the voltage drop across both ends of the resistance R3 is also increased. When the voltage drop is just greater than the forward voltage of the light emitting diode D2 in the photocoupler PC, the electric current is applied to the light emitting diode D2 to generate light. The transistor Q2 disposed opposite to the light emitting diode D2 is actuated by the emitted light to put the circuit ON. Then the electric current flowing through the relay coil Rc is shorted by the conducting transistor Q2 and the relay contact is opened since the electric current no longer holds it closed, whereby the circuit is opened to cut off the electric driving current for the motor 30 also. Furthermore in case the rotation of the mirror is stopped by an obstacle or the like on the way from the folded state to the erected state, it is also possible for the control device to open the circuit by a same manner as described above, and the electric driving current for the motor 30 is also cut off.

The rearview mirror assembly provided with the control device according to the invention is described hereinbelow.

As shown in FIG. 2, an electrically powered foldable rearview mirror assembly 20 comprises a frame 26 arranged on a cylindrical shaft 23 mounted on an extension 22 of a base 21, and a mirror body 25 rotated and supported in respective erected and folded states. The frame 26 comprises a root portion 27 provided with a sleeve 28 through which the shaft 23 extends and a wing portion 29 extending substantially vertically from the root portion 27. The wing portion 29 is coupled with an inner wall of the mirror body 25 by a screw 19 and an actuator unit (not shown) is arranged on a front surface of the wing portion to adjust the reflection angle of the mirror.

The electric driving means (motor) 30 and a speed reduction mechanism 33 are mounted on the root portion 27 of the frame 26 and a gear 40 is mounted around the shaft 23. The gear 40 has a clutch function so that it is coupled with the shaft for a normal use (automatically erecting and folding the mirror body) and is free of the shaft during a forced rotation. The last step gear of the speed reduction mechanism 33 is engaged with the gear 40 to electrically fold or to forcedly rotate the mirror body. The upper surface of a shaft flange 24 and the lower surface of the frame root portion 27 are structured and in contact with each other and rotation stop means 70 is composed of a projection 71 which is located on the shaft flange portion 24 and an arc-shaped groove 72 which is formed in an undersurface of the root portion 27 to engage the projection 71. A vertical wall 53 is connected to the root portion 27 of the frame 26 around the shaft and a gear box 52 is formed by an upper plate 54 connected to the wall 53 as shown in FIG. 2 and FIG. 3.

The speed reduction mechanism 33 includes a first step and a second step speed reduction gear 34, 37 and an end gear 39. The first step speed reduction gear 34 as shown by figures includes a worm wheel engaging a worm pinion 32 which is fixed on a motor shaft 31 and a worm engaging a worm wheel of the second step speed reduction gear 37. The second step speed reduction gear 37 includes the worm wheel engaging the worm of the first step speed reduction gear 34 and a plane gear to engage the end gear 39. The end gear 39 is engaged with the gear 40 which is provided with a ball clutch for releasably securing it to the shaft 23.

On an upper portion of the gear 40 which is supported by the shaft 23, steel balls 42, a ball guide 43 provided with a flange portion 44, a sleeve 50, a lower washer 46, a coil spring 47, an upper washer 48 and a fastener 49 are respectively provided in such a manner that steel balls 42 are always elastically contacted with the upper surface of the gear 40 (as shown in FIG. 2 and FIG. 3). Steel balls 42 are engaged in respective concave portions 41 formed on the upper surface of the gear 40 and respective upper halves of the steel balls 42 are loosely engaged in small holes 45 provided in the flange portion 44 of the ball guide 43 mounted on the shaft 23 in a rotational position locking manner. In FIG. 2, numeral 55 indicates a cable line which extends through the hollow portion of the shaft to drive and control the motor.

In the control device, if the motor 30 is actuated to rotate the end gear 39 of the speed reduction mechanism 33 and the gear 40 is in a fixed relationship to the shaft 23 because of a clutch mechanism including steel balls 42 and concave portions 41, the frame is rotated around the shaft 23 so as to rotate the mirror body 25 into the folded state or the erected state.

The speed reduction mechanism 33 is not limited to the mechanism as shown by figures of the present invention and it can be a speed reduction mechanism comprising a plane gear train (not shown) which is disclosed in U.S. patent application No. 08/042154 (Inventor is Toshihiro Mochizuki).

The bottom portion of the frame root portion 27 is provided with an annular groove 63 holding a plate stop element 65 for positioning the mirror body, a ring-shaped sliding portion 75 and an annular groove 77 for engagement of a shaft rib 76 protruding from the shaft flange 24 and an arc-shaped groove 72 for a rotation stop means respectively disposed concentrically to the shaft as shown by FIG. 3. Corresponding to the above, the shaft flange portion 24 is provided with hemispherical concave portions 61 to support steel balls 62, a contact surface opposite to the sliding portion 75 and a convex portion 71 adjacent to the annular shaft rib 76 and protruding into the arc-shaped groove 72.

Figure 4:
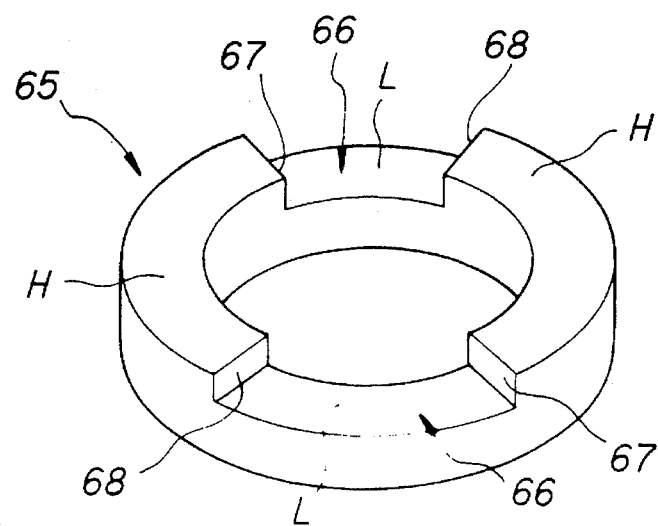
FIG. 4 is a detailed perspective view of a plate stopping element provided on the shaft of FIG. 3.

As shown by FIG. 4 which is a perspective view from the rear side of the plate stop element 65, two concave portions 66 having shoulders 67, 68 are provided symmetrically positioned in its undersurface to form H and L surfaces. Steel balls 62 are respectively supported by hemispherical concave portions 61 and are inserted in concave portions 66. The positioning means composed of the plate stop element 65 and steel balls 62 is double protected by a first barrier provided by the shaft rib 76 and the arc-shaped groove 72 and a second barrier provided by the ring-shaped sliding portion 75. The positioning means is also protected from water, dust or foreign contamination so that the rotation and moving ability of steel balls can be maintained. Therefore the accurate and constant rotation and stopping of the mirror body can be achieved.

Figure 5A:
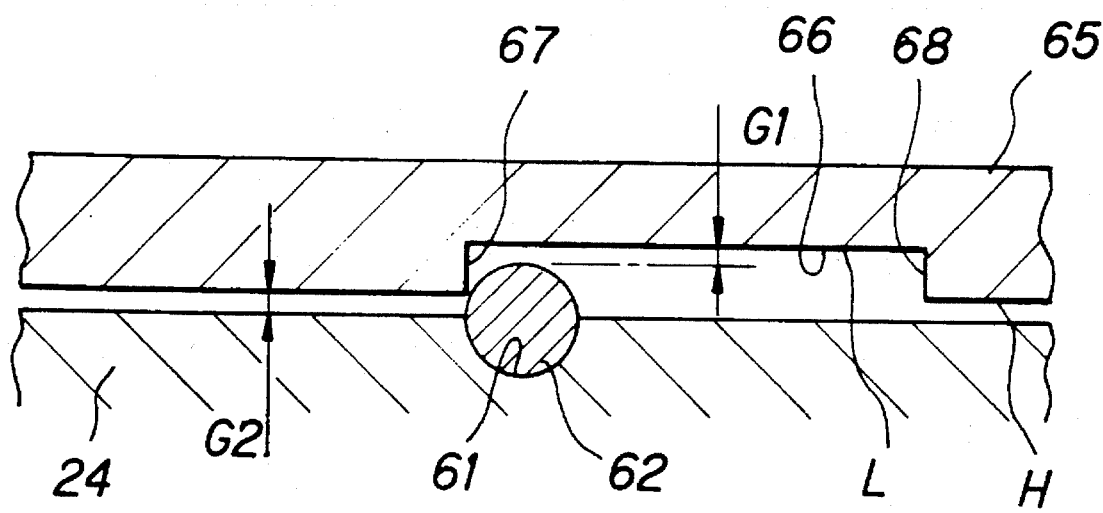
FIGS. 5A and 5B are schematic cross-sectional action views showing operation of a plate stopping element in the rearview mirror together with a ball and shaft respectively corresponding to a mirror body erected state and to a mirror body folded state.
Figure 5B:
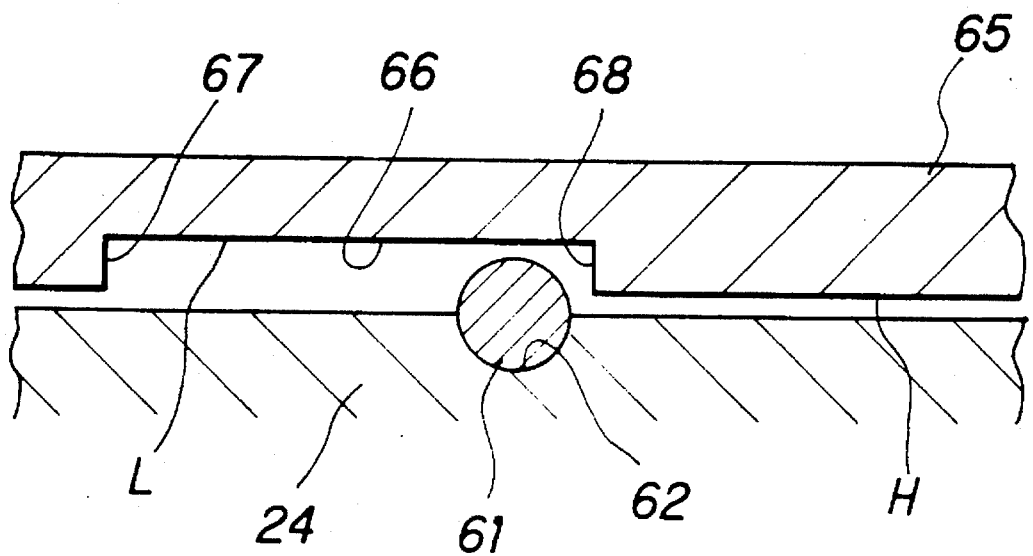

FIG. 5 is a partially cut-away action view along the annular-shaped plate stop element 65 and a contact position of steel balls 62 and the plate stop element 65 is shown. FIG. 5(a) shows the condition of plate stop element 65 and balls 62 with the mirror body positioned at the erected state and FIG. 5(b) shows the condition of plate stop element 65 and balls 62 with the mirror body positioned at the folded state thereof. Numerals G1, G2 designate gaps respectively formed between the top of the steel ball 62 and the plate stop element 65 to prevent abrasion of the H surface and L surface.

Figure 6:
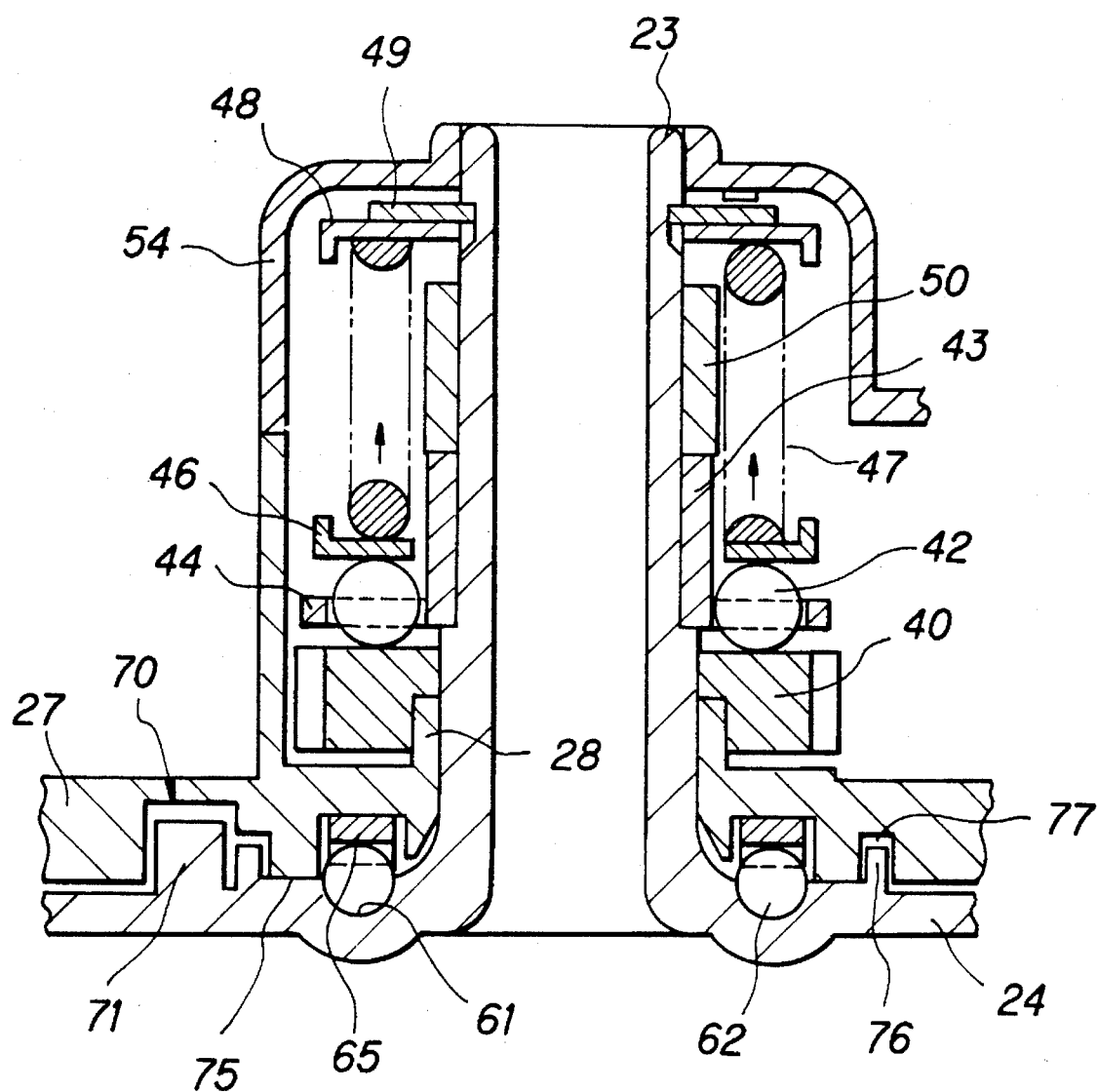
FIG. 6 is a detailed cutaway vertical cross-sectional view of the mechanism near the shaft in a condition in which the mirror body is being rotated from the erected state toward the folded state.

When the mirror body is rotated from the erected state to the folded state, the motor 30 is actuated to rotate the end gear 39 of the speed reduction mechanism and the gear 40 which engages with gear 39 starts to rotate, while as described hereinbefore, the gear 40 is already coupled to the shaft by the ball clutch, and as a result the frame 26 is rotated. By rotation of the frame 26, steel balls 42 which are loosely guided in the small hole 45 are rotated from the concave portions 41 of the gear 40 to the gear surface so that coil spring 47 is urged in the direction shown by the arrow (FIG. 6).

When the mirror body is rotated to the erected state, the shoulder 67 of the plate stop element 65 which is the positioning means at the erected state contacts with the ball 62 (FIG. 5(a)) and the motor rotation is mechanically stopped. Because the motor rotation is stopped, the power supply to the motor is cut off by the control device due to the increased electric driving current as described hereinbefore. Furthermore when the mirror is rotated to the folded state, the convex portion 71 which is rotation stop means at the folded state contacts with the end portion of the arc-shaped groove 72 to mechanically stop the rotation of the motor 30, and the electric power supply is cut off by an operation of the control device.

Figure 7:
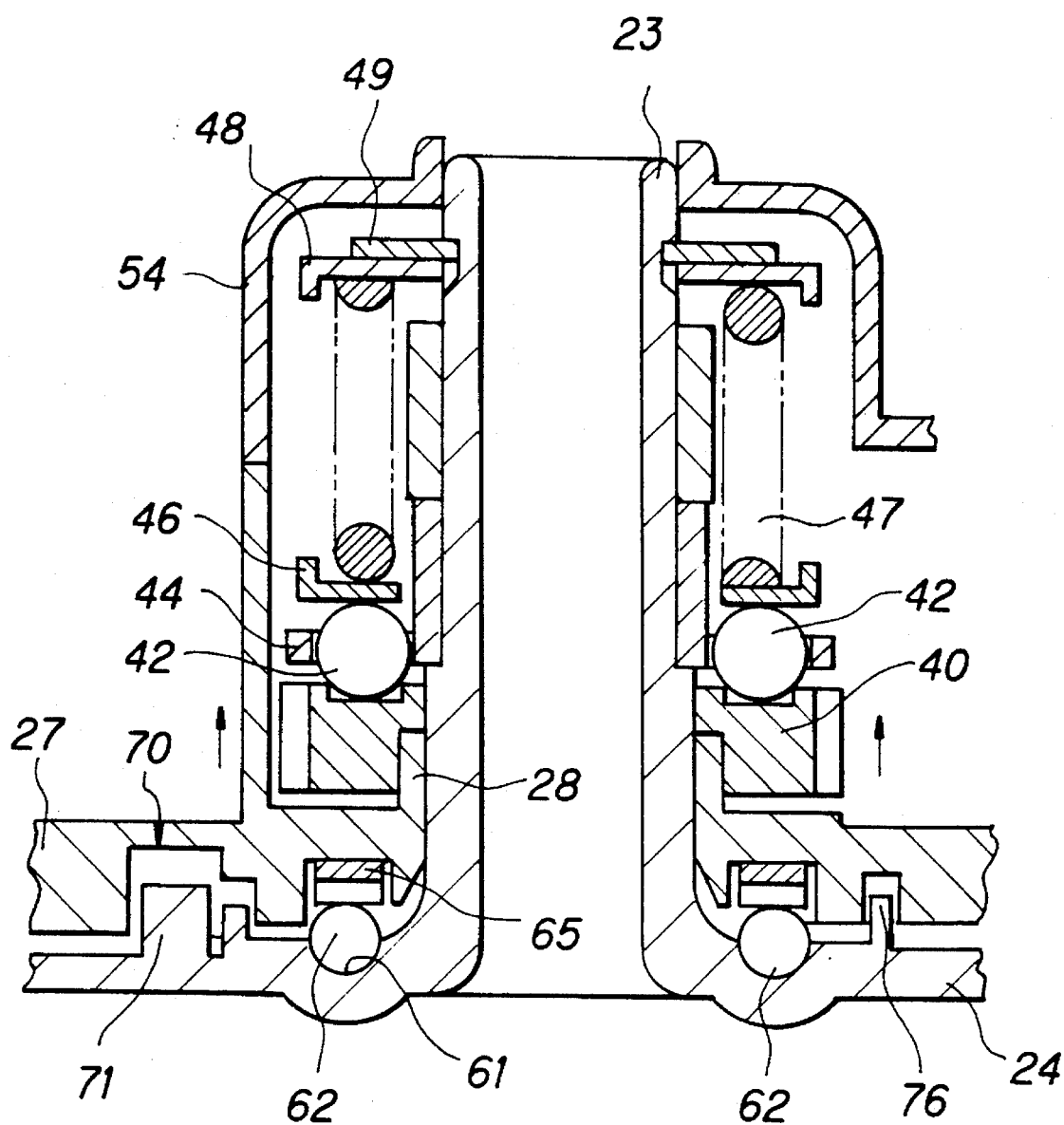
FIG. 7 is a detailed cutaway vertical cross-sectional view of the mechanism near the shaft in a condition in which the mirror body is forced to rotate manually or by an external force.

When the mirror body is forcibly rotated from the controlled position by an external force, steel balls 62 are rotated from the shoulder 67 and slide over H surface of the plate stop element 65, as shown by FIG. 7, and the frame is slight upwardly moved from the shaft flange portion 24. At that time the driver connects either switch contacts A1, A2 or switch contacts B1, B2 to rotate the mirror position to the correct position.

As described above, in the control device for the electric powered foldable rearview mirror, when the electric driving current is increased by an overload on the motor, the electric current flowing through the resistance which is between the switching circuit and the motor is increased to drive and detect the semiconductor, and the comparatively complicated operation such as adjusting the position with the circuit changing position at the erected or folded position of the mirror body is eliminated. Furthermore the photocoupler is used as detecting means for the motor driving electric current. The relay contact for controlling the electric driving current is also sealed in a package. There is no danger of faulty operation of the device caused by an imperfect contact due to the foreign contamination. A small number of parts assembled in the control device of the present invention can achieve a simple and compact circuit of the device and a package containing a relay control circuit can be assembled in the mirror body. As described above, the quality and the reliability of the electrically powered foldable rearview mirror can be improved and the compact and small capacity rearview mirror can be achieved with a low cost because of the simple and compact circuit of the invention.

We claim:

1. A control device for an electrically powered foldable rearview mirror for automobiles, said rearview mirror comprising a base, a shaft arranged on the base, a mirror body rotatable on the shaft between a predetermined folded position and a predetermined erected position, an electric motor contained in the mirror body for rotating the mirror body and rotation stop means for halting mirror body rotation at the folded position and at the erected position, said rotation stop means being arranged around the shaft;

wherein said control device comprises a switching circuit including means for connecting a power supply to said electric motor to rotate the mirror body to the erected position and means for connecting a power supply to said electric motor to rotate the mirror body to the folded position;

a relay circuit connected electrically to the electric motor and including means for supplying and for cutting off an electric current from said power supply to said electric motor; and a relay control circuit comprising a resistance connected electrically with the electric motor so as to produce a voltage drop from the electric current supplied to the electric motor from the power supply; means for activating the relay circuit to cut off said electric current to said motor when said mirror body rotation is stopped by said rotation stop means or by an externally applied force on said mirror body; and means for determining when said mirror body rotation is stopped, wherein said means for activating the relay circuit and said means for determining when said mirror body rotation is stopped comprise a semiconductor device connected electrically in parallel with the resistance, said semiconductor device including means for detecting when said voltage drop is greater than a predetermined threshold voltage of the semiconductor device.

2. The control device as defined in claim 1, wherein the semiconductor device comprises a diode having a pn junction and including means for performing a switching operation when a voltage applied to said diode exceeds a diode threshold voltage.

3. The control device as defined in claim 2, wherein said diode threshold voltage is one of a forward voltage and a Zener-voltage of said pn junction.

4. The control device as defined in claim 1, wherein the semiconductor device includes a transistor and a pn junction and including means for performing a switching operation when a voltage applied to the pn junction exceeds a forward voltage of said pn junction.

5. The control device as defined in claim 1, wherein said semiconductor device comprises a light emitting diode, means for activating said light emitting diode when said voltage drop exceeds the predetermined threshold voltage of the semiconductor device so that the light emitting diode emits light, means for detecting said light emitted from said light emitting diode and means for activating said relay circuit to cut off the electric current to the electric motor when said light emitted from said light emitting diode is detected by said means for detecting, said means for detecting being positioned opposite to said light emitting diode.

6. The control device as defined in claim 5, wherein the means for detecting said light emitted from said light emitting diode includes a phototransistor.

7. The control device as defined in claim 5, wherein the means for detecting said light emitted from said light emitting diode includes cadmium sulfide CdS.

8. The control device as defined in claim 5, wherein the relay control circuit includes a photocoupler comprising the light emitting diode and a phototransistor as said means for detecting said light from said light emitting diode.

9. An electrically powered foldable rearview mirror comprising a base, a shaft arranged on the base and having a shaft flange portion, a mirror body rotatable on the shaft between a folded position and an erected position, a frame mounted in the mirror body and having a root portion provided with a hole through which the shaft extends and a wing portion to support a mirror element;

an electric driving means contained in the mirror body for rotating the mirror body and a speed reduction gear mechanism connected with the electric driving means and the mirror body, said electric driving means and said speed reducing gear mechanism being fixed to the frame root portion;

rotation stop means for halting mirror body rotation at the folded position and at the erected position, said rotation stop means being arranged around the shaft between an upper surface of the shaft flange portion and the frame root portion;

a gear box mounted on the frame root portion to surround the shaft and the speed reduction gear mechanism, said gear box including a vertical wall connected to the frame root portion and an outer plate engaged with an upper portion of the vertical wall and engaged with an upper portion of the shaft;

a clutch gear engaged on the shaft to engage with an end gear of the speed reduction gear mechanism; and a control device comprising a switching circuit including means for connecting a power supply to said electric driving means to rotate the mirror body into the erected state and means for connecting a power supply to said electric driving means to rotate the mirror body into the folded state;

a relay circuit connected electrically to the switching circuit and to the electric motor and including means for supplying and for cutting off an electric current from said power supply to said electric motor; and a package arranged on the outer plate of the gear box, said package including a relay control circuit comprising a resistance connected electrically with the electric motor so as to produce a voltage drop from the electric current supplied to the electric motor from the power supply; means for activating the relay circuit to cut off said electric current to said motor when said mirror body rotation is stopped by said rotation stop means or by an externally applied force on said mirror body; and means for determining when said mirror body rotation is stopped, wherein said means for activating the relay circuit and said means for determining when said mirror body rotation is stopped comprise a semiconductor device connected electrically in parallel with the resistance, said semiconductor device including means for detecting when said voltage drop is greater than a predetermined threshold voltage of the semiconductor device.

10. The control device as defined in claim 9, wherein the package includes the relay circuit as well as the relay control circuit.

11. The control device as defined in claim 9, wherein said semiconductor device comprises a light emitting diode, means for activating said light emitting diode when said voltage drop exceeds the predetermined threshold voltage of the semiconductor device so that the light emitting diode emits light, means for detecting said light emitted from said light emitting diode and means for activating said relay circuit to cut off the electric current to the electric motor when said light emitted from said light emitting diode is detected by said means for detecting, said means for detecting being positioned opposite to said light emitting diode.

12. The control device as defined in claim 11, wherein the means for detecting said light emitted from said light emitting diode includes a phototransistor.

13. The control device as defined in claim 11, wherein the means for detecting said light emitted from said light emitting diode includes cadmium sulfide CdS.

* * * * *